United States Patent [19]
Cooper

[11] Patent Number: 5,979,022
[45] Date of Patent: Nov. 9, 1999

[54] T-BAR WIRELINE CLAMP

[76] Inventor: Larry V. Cooper, P.O. Box 16573, Lake Charles, La. 70616

[21] Appl. No.: 08/917,506

[22] Filed: Aug. 26, 1997

[51] Int. Cl.[6] ..................................................... F16G 11/06
[52] U.S. Cl. .................. 24/132 R; 24/135 R; 248/316.5; 294/91
[58] Field of Search .............................. 24/132 R, 134 R, 24/135 R, 115 R; 248/316.5, 230.4; 294/104, 91

[56] References Cited

U.S. PATENT DOCUMENTS 1,711,005   4/1929   West et al. .............................. 24/135 R
4,143,446   3/1979   Down ..................................... 24/135 R Primary Examiner—James R. Brittain
Attorney, Agent, or Firm—William H. Holt

[57] ABSTRACT

A heavy duty clamp for cables or wires, and the like, said clamp having increased strength and resistance to distortion or breakage. Two overlying clamp plates, or segments, are held against relative movement by one of the plates having a shoulder member that engages with a portion of the other plate. The plates contain a split, tubular gripping member and the plates have increased longitudinal strength by having extended ends of the plates to provide protection against shearing forces created by the split tubular gripping member against the adjacent ends of the clamp plates.

14 Claims, 1 Drawing Sheet

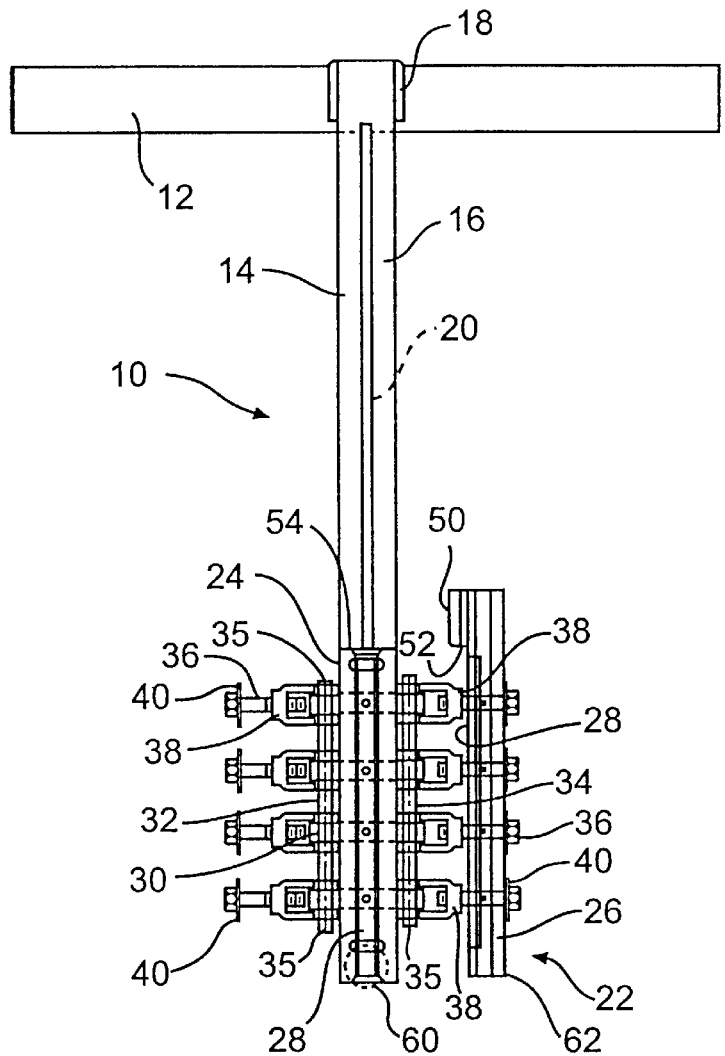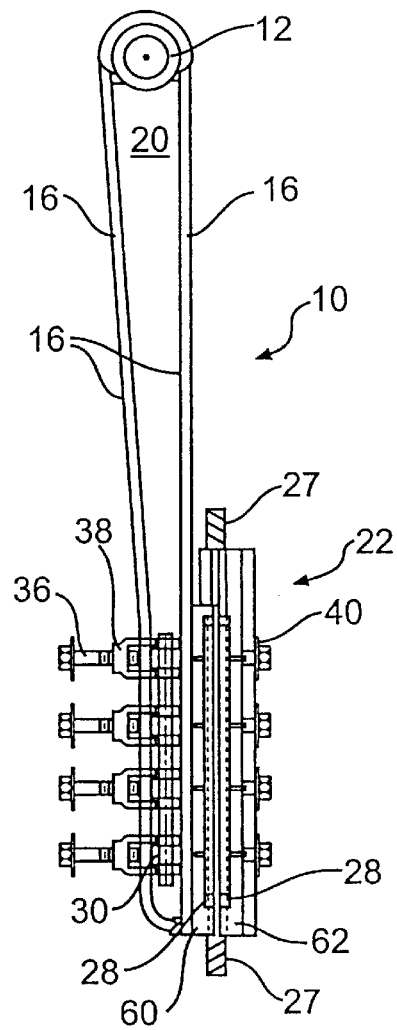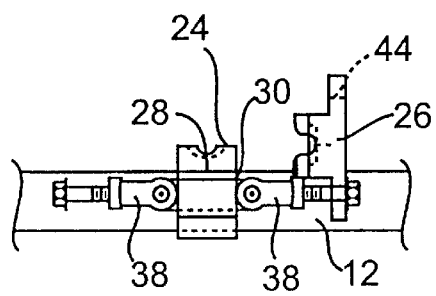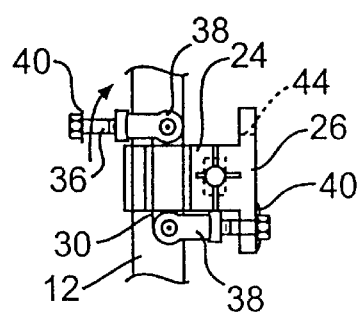

T-BAR WIRELINE CLAMP

BACKGROUND OF THE INVENTION

This invention relates to a clamping tool and more particularly to an improved T-bar wire line clamping tool especially usable in the well drilling industry.

In the business of drilling wells for the recovery of oil, natural gas, water and the like, specialty tools and accessories are used whenever necessary to recover subsurface tools that, at times, become stuck in the well bore. Recovery of these quite valuable tools, as well as rescue of the well itself, is performed by following a series of steps generally referred to as "a fishing operation". A number of individual tools are used to comprise a fishing assembly, some of these tools being a cable hanger, a rope socket, a sinker bar, a spear head overshot, and others.

In a conventional fishing operation, it is known to provide a cable hanger for holding a cable during the cutting and application of rope sockets. The cable hanger is also used at the conclusion of the operation to pull the cable. Free from the cable head in the stuck tool.

A known type of cable hanger includes a clamp comprised of a hinged member including a pair of clamp segment members, one being a hinged member, each of which carry one-half of a longitudinally split, tubular liner that is dimensioned to fit the size of cable being used at the time. The clamp segments and liner are tightened upon a cable with a series of clamping bolts and the clamp is carried on a cable hanger shaped in the form of a "T" which provides a sturdy support for the assembly during holding and/or pulling operations.

SUMMARY OF THE INVENTION

The present invention relates to a cable hanger having an improved clamp for use in the aforementioned fishing assembly for recovering tools from a well bore. Various design enhancements have been made to improve the safety of the tool for providing better protection for the work crew, and also for the well bore and tools.

A primary improvement over the previous cable hangers is the provision of an antishear stop member secured to, or formed as part of, one of the clamp segment members for making contact with the other of the pair of clamp segment members. When the stop member on the one clamp segment engages with the other clamp segment, the shearing forces are transferred into the stem of the T-bar clamp body, thereby significantly reducing the transverse loading to the hinged segment member.

A further improvement resides in the lengthening of each clamping segment member at the ends thereof that are remote from the handle of the T-bar. This feature provides a larger shear plane area to more securely hold the usually brass or bronze liner inserts in place under severe load conditions. Each of the clamp segment members may be formed as one-piece; in this event, the shear plane region can be machined into the lower end of the clamp segment, namely, the end remote from the handle, to eliminate a prior art feature of adding a welded stop to the clamp segment for holding the liner inserts in place.

A still further feature of the invention is that the flange thickness on the body of the T-bar clamping tool has been thickened to provide for overall increased body strength and ruggedness while only minimally increasing the overall weight of the tool.

BRIEF DESCRIPTION OF THE DRAWINGS

FIG. 1 is an elevational view of the T-bar and clamp mechanism and shows the clamping segments with a hinged segment shown rotated to open position.

FIG. 2 is a side view of FIG. 1 with parts thereof being rotated for clarity.

FIG. 3 is a fragmentary, bottom end view of the T-bar and clamp mechanism of FIG. 1.

FIG. 4 is a fragmentary, bottom end view of the T-bar and clamp mechanism of FIG. 2.

DESCRIPTION OF THE PREFERRED EMBODIMENT

A cable hanger in the form of a T-bar, generally indicated by the numeral 10, is shown in FIG. 1 as including a handle or cross-bar 12 and a stem 14, the latter preferably being formed of an elongated strap or flange member 16 that is generally doubled upon itself and wrapped about handle 12 and may be secured thereto by a weld fillet 18. Strength of the T-bar 10 is also increased by providing a web 20 disposed between generally parallel portions of the doubled over strap or flange member 16, as is best seen in FIG.2 and shown in phantom in FIG. 1.

A hinge member or clamp, generally indicated by the numeral 22, is comprised of a first clamping segment 24 and a second clamping segment 26.

Each of the clamping segments 24 and 26 are generally rectangular and have a hollow, longitudinal central portion each of which contains one-half of a longitudinally split, hollow tube 28 that is preferably formed of a somewhat soft metal, such as brass or bronze, and which is used to grip a pulling cable 27, or wire, in a manner to be subsequently described.

First clamping member 24 is secured to strap 16, as is shown in FIG. 1, preferably by being welded together or they may also be secured together by high strength bolts, or the like. A series of four cross-members or brackets 30 are disposed transverse to strap 16 and located adjacent a free end thereof between portions of the doubled over strap or flange member 16. Cross-members or brackets 30 are used to mount a pair of pins 32 and 34 which are secured thereto by cotter pins 35 on opposite sides of, and extending parallel to strap 16. Pins 32 and 34 each mount a series of four hingedly mounted bolts 36, each of which are threadedly mounted in generally U-shaped bolt hinges 38. Each bolt 36 also carries a washer 40 that engages, respectively, with a flat, out surface of the second clamping segment 26 when the corresponding bolt hinge is rotated (as is shown by the arrow in FIG. 4) and places individual bolts 36 in side openings 44 in clamping segment 26, as is best seen by comparing FIGS. 3 and 4. Each of the eight bolts 36 is then tightened down with a conventional torque wrench to cause the liner halves 28 to securely grip the cable 27 between the first and second clamping segments 24 and 26. A pulling mechanism (not shown) is connected to, and pulls upon, cross-bar 12 and hinge member or clamp 22 in a known manner.

As is best shown in FIG. 1, the second clamping segment member 26 is provided at its one end proximate cross-bar 12 with an anti-shear stop member 50 having a shoulder 52 for operatively engaging an end 54 of first clamping segment member 24 during a pulling operation upon the cable hanger 10, clamp 22 and cable 27. First clamping segment member 24 is fixedly secured to the strap or flange member 16 of T-bar 10; thus, stop member 50 and shoulder 52 engage the end 54 and preclude movement, or slippage, or distortion of second clamping segment member 26 and the associated bolts, bolt hinges and tie-down pins. A significant increase in strength and safety results from such an improvement.

Also, as is best shown in FIGS. 1 and 2, the first and second clamping segment members 24 and 26 each have extended end portions including extended sections 60 and 62 for withstanding high shearing forces that are transmitted through the split tubular member 28 during a pulling operation. This feature provides additional strength for precluding slippage of tubular member 28 during a pulling operation.

It is to be understood that the foregoing is a description of a preferred embodiment of the invention and defines the present best mode of the invention. However, it is to be understood that variations and modifications thereof can be made without departing from the spirit and scope of the invention as defined hereafter in the appended claimed subject matter.

I claim:

1. A clamp for a cable and the like, said clamp comprising a pair of clamp segments, said clamp segments including means for receiving a cable therebetween when disposed in side-by-side relation; means cooperating with said pair of clamp segments for creating compression forces upon the cable; and shoulder means (52) carried by one of said pair of clamp segments and engageable with an end (54) of the other of said pair of clamp segments for transferring force from said one clamp segment to said other clamp segment.

2. A clamp as defined in claim 1 including a hollow portion extending longitudinally thereof; a split tubular member disposed in said hollow portion and abutting against an end portion of each of said clamp segments remote from said shoulder means (52); said end portions including extended sections (60, 62) for withstanding high shearing forces transmitted through said tubular member.

3. A clamp as defined in claim 1 wherein said shoulder means comprises a thickened part of one of said pair of clamp segments.

4. A clamp as defined in claim 3 wherein said thickened part extends across the width of each of said pair of clamp segments.

5. A clamp for a cable and the like, said clamp comprising a pair of clamp segments, said clamp segments including means for receiving a cable therebetween when disposed in side-by-side relation; means cooperating with said pair of clamp segments for creating compression forces upon the cable; and shoulder means carried by one of said pair of clamp segments and engageable with the other of said pair of clamp segments for transferring force from said one clamp segment to said other clamp segment, and a T-bar comprised of a cross-bar and a stem portion; said clamp being secured to said stem portion adjacent an end thereof remote from said cross-bar; said stem portion being constructed of high strength metal and including at least a portion thereof being bent about said cross-bar and secured thereto by a welded fillet.

6. A clamp as defined in claim 5 wherein said stem portion includes a strap member (16) having doubled over portions, and a web (20) disposed between said portions of said doubled over strap member.

7. A clamp as defined in claim 5 wherein said shoulder means comprises a thickened part of one of said pair of clamp segments.

8. A clamp as defined in claim 7 wherein said thickened part extends across the width of each of said pair of clamp segments.

9. A clamp for a cable and the like, said clamp comprising a pair of clamp segments, said clamp segments including means for receiving a cable therebetween when disposed in side-by-side relation; means cooperating with said pair of clamp segments for creating compression forces upon the cable; and shoulder means carried by one of said pair of clamp segments and engageable with the other of said pair of clamp segments for transferring force from said one clamp segment to said other clamp segment, said shoulder means comprising a thickened part of one of said pair of clamp segments which is disposed for contacting and end of said other of said pair of clamp segments; wherein said thickened part extends across the width of each of said pair of clamp segments; said clamp further including a T-bar comprised of a cross-bar and a stem portion; said clamp being secured to said stem portion adjacent an end thereof remote from said cross-bar; said stem portion being constructed of high strength metal and including at least a portion thereof being bent about said cross-bar and secured thereto by a welded fillet.

10. A clamp as defined in claim 9 wherein said shoulder means comprises a thickened part of one of said pair of clamp segments and provides means disposed for contacting an end of said other of said pair of clamp segments, and said thickened portion is on the end of said clamp proximate said cross-bar.

11. A clamp as defined in claim 9 wherein said stem portion includes a strap member (16) having doubled over portions, and a web (20) disposed between said portions of said doubled over strap member.

12. A clamp for a cable and the like, said clamp comprising a pair of clamp segments, said clamp segments each having a hollow portion formed therein, cable engaging means contained in said hollow portions for receiving a cable therebetween when disposed in side-by-side relation; means cooperating with said pair of clamp segments for creating compression forces upon said cable engaging means and upon the cable, said clamp segments having extended sections (60, 62) at the end of the clamp subjected to maximum shear forces adjacent said cable engaging means for being engaged by ends of said cable engaging means for absorbing shearing forces generated during a pulling operation.

13. A clamp as defined in claim 12 wherein said cable engaging means comprise a longitudinally-split tubular member, said tubular member abutting against said extended sections for precluding slippage of said tubular member during a pulling operation.

14. A clamp as defined in claim 12 wherein each said clamp segment is formed of one-piece and said hollow portions are machined therein leaving said extended sections for holding said tubular member in place during a pulling operation.

* * * * *